(No Model.)
A. STÖCKER.
BALANCE.
No. 499,479. Patented June 13, 1893.
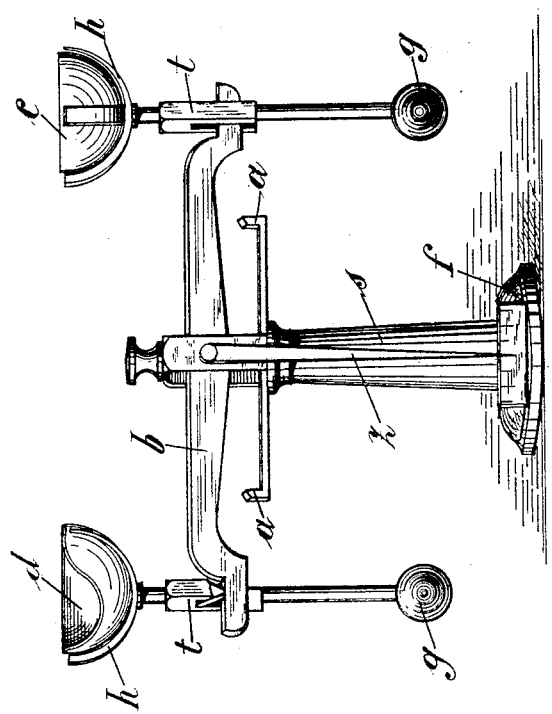
Attest
Inventor
Alexander Stöcker
by Ellis Spear
Atty.

UNITED STATES PATENT OFFICE.

ALEXANDER STÖCKER, OF ELBERFELD, GERMANY.

BALANCE.

SPECIFICATION forming part of Letters Patent No. 499,479, dated June 13, 1893.

Application filed January 25, 1893. Serial No. 459,722. (No model.)

*To all whom it may concern:*

Be it known that I, ALEXANDER STÖCKER, a subject of the Emperor of Germany, residing at Elberfeld, in the Kingdom of Prussia and German Empire, have invented certain new and useful Improvements in Taring Scales or Balances, of which the following is a full, clear, and exact description, reference being had therein to the accompanying drawing, which forms a part of this specification.

My invention is an improved taring scale or balance for weighing the smallest quantities of materials, such as drugs, jewels, gold, &c.; and the object of the invention is to provide taring scales, by which the smallest weights can be rapidly and accurately determined, designed especially for the use of apothecaries for weighing drugs, but also for jewels, gold, and similar materials.

The scales are particularly designed to replace the usual hand-balance which consists of pans suspended by cords from a scale-beam, this construction presenting many disadvantages. The new balance is therefore so constructed that by omitting the perishable and easily unwound cords, the pans are arranged above the scale beams and are therefore more readily accessible, and are easily removed and replaced by others of equal weight. By thus arranging the pans above the scale beam they can be used directly to dump out the material weighed, and they can be readily cleaned.

The new scales are shown in the accompanying drawing in which the figure represents a side elevation of the device.

In the figure the scales are shown as comprising the upright column $s$, provided with the foot plate $f$, and upon which column the beam $b$, rests in the well known manner on knife edges. The ends of the beam serve as bearings, each for a pan carrier $t$, which, as shown in the drawing, is provided with the peculiar four armed holder to receive the pans, as shown at $h$, above the beam. Below the beam each pan carrier is provided with a counterweight $g$, for holding the carrier in a vertical position. The pan carrier $t$, rests upon the scale-beam upon a prismatic knife edge which is set into a recess provided below the holder $h$, on the rod, which is thickened at this point, of the carrier $t$. This construction permits the pan carrier to be held constantly in a vertical position by the counterweight.

For limiting the oscillations of the scale beam two hooks or supports are provided upon the upright column, one upon each side thereof, and at the foot of the column is placed the scale, over which plays the pointer $z$, which is carried by the scale beam $b$.

The smaller pan $c$, is designed for the weights, while the other $d$, consists of a celluloid powder boat. All scales are to be provided each with a considerable number of such powder boats, so as not only to facilitate the placing of the material in receivers after it has been weighed, but also to provide special pans for weighing poisons and the like.

Having thus described my invention, what I claim is—

In combination with the standard having a graduated scale at the base thereof, a scale beam mounted upon the upper end of the standard, a pointer connected to the scale beam and extending downwardly therefrom with its point in proximity to the scale, and counter balanced pan supporting rods mounted upon the ends of the scale beam, said rods having slots adapted to receive the ends of the scale beam and knife edges extending down from the upper ends of the slots and bearing on the upper side of the scale beam, substantially as described.

In witness whereof I hereunto set my hand in presence of two witnesses.

ALEXANDER STÖCKER.

Witnesses:
RUDOLPH FRICKE,
WM. ESSENWEIN.